United States Patent Office 3,163,625
Patented Dec. 29, 1964

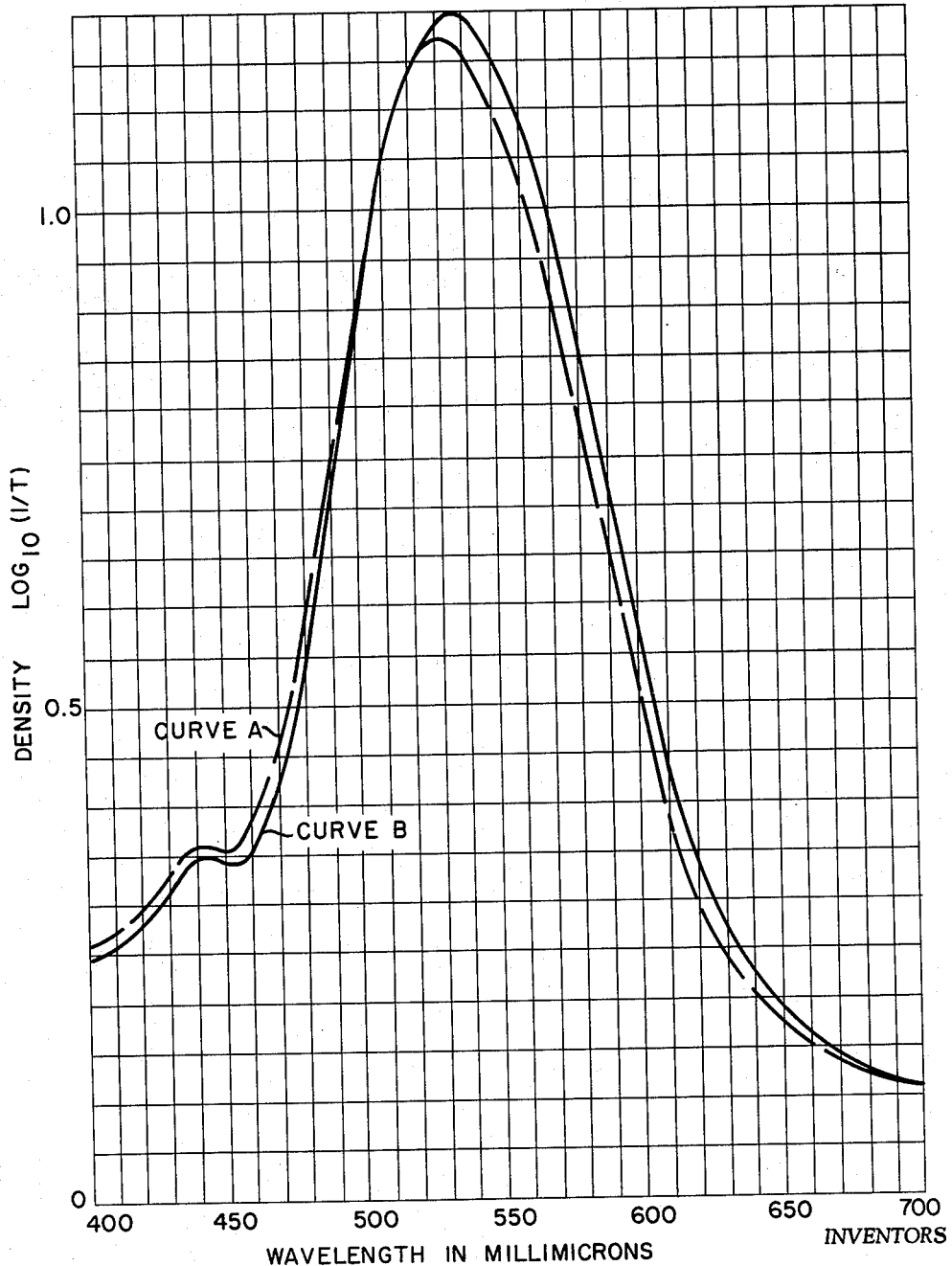

3,163,625
COLOR-FORMING MONOMERS AND POLYMERS OF ACRYLIC ACID AMIDES OF 3-AMINOPYRAZOLONE
John Charles Firestine, South River, and Jacob Quentin Umberger, Holmdel, N.J., assignors to E. I. du Pont de Nemours and Company, Wilmington, Del., a corporation of Delaware
Filed Apr. 13, 1960, Ser. No. 21,959
5 Claims. (Cl. 260—80.5)

This invention relates to a new class of addition polymerizable color-forming monomers, to addition polymers and copolymers of such monomers and to photographic silver halide emulsions containing these products. More particularly, it relates to acrylic and α-alkacrylic acid amides of 3-aminopyrazolones and to polymers and copolymers of such amides with addition polymerizable modifying monomers.

Various monomeric and polymeric color formers embodying a pyrazolone nucleus or nuclei are known. In many of the monomeric color formers, the pyrazolone nucleus is linked through an acyclic amide group to an aliphatic hydrocarbon radical of high molecular weight. The previous polymeric color formers having an amide linkage, in general, are amides of polymeric acids and the amido nitrogen atom is not attached directly to the pyrazolone ring. Since the basic polymer structure has already been established in such color formers, it is not possible to readily vary the physical properties of the resulting polymers.

An object of this invention is to provide a new class of color-forming compounds containing a pyrazolone nucleus. Another object is to provide new addition copolymers having a plurality of pyrazolone nuclei directly linked to the chain through an acyclic amide linkage. A further object is to provide such copolymers which contain units of different groups including solubilizing groups. A still further object is to provide such copolymers which do not diffuse in thin water-permeable colloid layers of photographic elements. A still further object is to provide a process for preparing copolymers containing pyrazolone nuclei in units of the polymer and different units for modifying the solubility, compatibility with other emulsion binding constituents, and non-diffusing characteristics of the polymer. Still further objects will be apparent from the following detailed description of the invention.

The addition copolymers of this invention are copolymers of:
(a) A substituted 3-amidopyrazolone of the formula

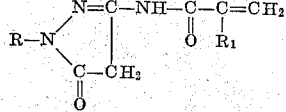

wherein R is a monovalent cyclic radical of aromatic character directly connected to the intracyclic nitrogen atom by an intracyclic carbon atom, said radical being taken from the group consisting of aryl, e.g., phenyl, m-tolyl, p-methoxyphenyl, p-chlorophenyl, p-bromophenyl, p-cyanophenyl, p-nitrophenyl, and naphthyl; 2-benzoxazoyl, 2-benzothiazolyl, 2-, 3-, and 4-pyridyl and 2-quinolyl; $R_1$ is hydrogen; alkyl of 1-4 carbons or chlorine.

(b) A normally non-gaseous, ethylenically unsaturated monomer containing at least one terminal ethylenic group ($CH_2=C<$) and a group ionizable in aqueous solution having pH 3–11 and being capable of forming a high polymer in the presence of an addition polymerization initiator; and/or (c) A normally non-gaseous ethylenically unsaturated monomer containing at least one terminal ethylenic group said monomer being non-ionizable in aqueous solution of pH 3–11 and capable of forming a high polymer in the presence of an addition polymerization initiator.

Suitable ionizable monomers for component (b) include acrylic acid, α-alkacrylic acids where alk is an alkyl radical of 1–4 carbons, e.g., methyl, ethyl, propyl and butyl; α-chloracrylic acid, styrene sulfonic acid and its alkali metal, ammonium and amine salts, sodium vinyl sulfonate, 2- and 4-vinylpyridine and N-vinyl-2-pyrrolidone acid salts (e.g., hydrochloric or sulfuric acid salts) or quaternary alkyl or aralkyl salts; and quaternary salts of diethylaminoethyl acrylate or methacrylate.

Suitable non-ionizable monomers for component (c) include styrene; esters of monohydric alcohols of 1–8 carbons, e.g., methanol, ethanol, n-propanol, n-butanol and 2-n-hexanol with the above listed acrylic, alkacrylic and α-chloracrylic acids; acrylamide, ethacrylamide; acrylonitrile, methacrylonitrile; vinylethyl ether and ureidoethyl vinyl ether; and methyl vinyl ketone.

The monomers of types (b) and (c) are liquids or solids at normal temperature and pressure, and, in general, have a boiling point above about 100° C., and a molecular weight less than 1500 and each are used in amounts of 5–45 parts by weight together with 90–10 parts by weight of component (a).

In general, the copolymers of this invention contain 90 to 10 parts of (a), 5 to 45 parts of (b) and 5 to 45 parts of (c), said parts being by weight.

The preferred copolymers of the invention consist of intralinear units of the formulae:

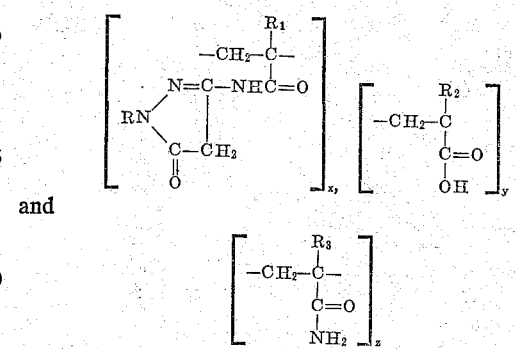

and wherein R and $R_1$ have the same values as in the first structural formula given above, $R_2$ and $R_3$ are each a member selected from the group consisting of hydrogen, alkyl of 1–4 carbon atoms and chlorine, x, y and z constitute the number of the respective units in the polymer. In general, the copolymers have molecular weights in excess of 2500 up to 100,000 and more.

In both the formula for the monomer and in the above formulae, the pyrazolone unit is shown in one of its tautomeric forms.

The tricomponent copolymers of the invention can be made by copolymerizing a mixture of the three components, for example (1) the 1-substituted 3-acrylamido or alpha-alkacrylamido-5-pyrazolone monomer, (2) acrylic acid and (3) acrylamide in a suitable solvent medium and in the presence of an addition polymerization initiator preferably one which is active thermally below 100° C. However, initiators activatable by actinic light can be used. Suitable initiators are given in U.S. Patent 2,830,972 and in the examples of this application.

The copolymers of the invention are useful as magenta color formers since they form magenta azomethine dyes when latent silver halide images are developed in their presence by means of alkaline developer solutions containing a primary aromatic amine color-developing agent. Suitable such agents are described in U.S. Patent 2,481,476. The magenta dye images have excellent color, definition and stability. The copolymers can be admixed with water-permeable organic colloids of high molecular weight having protective colloid properties both of natural and synthetic type which are binding agents for silver halide grains. They are useful in thin silver halide emulsion layers of multilayer color films and do not migrate or diffuse when such films are treated in aqueous developing, fixing, bleaching or washing baths. They are especially useful in gelatino-silver halide emulsions and emulsion layers.

Since the unsaturated monomers of constituent (a) of the copolymers of the invention are new compounds, the following representative procedures for preparing the same and examples of the invention are given below. Suitable 1-substituted-3-amino-5-pyrazolones having the 1-substituent listed above are disclosed in J. Am. Chem. Soc., vol. 66, pp. 1851–55 (1944). These amino compounds can be reacted with acrylyl chloride or methacrylyl chloride to form unsaturated amides by the exemplary process described below. The amides can be copolymerized as taught above.

*Procedure A.*—1 - phenyl - 3 - methacrylamido - 5-pyrazolone monomer: To a 3-liter, 3-necked round-bottom flask fitted with a stirrer, thermometer and condenser were added:

175 g. (1 mole) 1-phenyl-3-amino-5-pyrazolone
1000 ml. dry pyridine

The mixture was stirred and 156 g. (1.5 moles) methacryl chloride added drop-wise not allowing the temperature to rise above 40° C. After the addition was complete the mixture was warmed to 70° C. About 800 ml. of the pyridine was distilled off in the vacuum. The residue was diluted with 4 liters of ice water and a gummy solid separated which soon solidified. After standing overnight, the product was filtered on a Buchner filter and washed with water and sucked dry as possible. This was followed by recrystallization from 400 ml. of ethanol, filtration on a suction filter, washing with ethanol and washing with ether. The product, 1-phenyl-3-methacrylamido-5-pyrazolone, was in the form of sparkling pale yellow crystals weighing 100 g. (41% of theoretical), M.P. 170–172° C.

*Procedure B.*—1 - (p - bromophenyl) - 3 - methacrylamido - 5 - pyrazolone monomer: To a 2-liter round-bottomed flask fitted with a stirrer was added:

326 ml. sodium ethylate, 18% by weight
36.9 g. ethylcyanoacetate
73 g. p-bromophenylhydrazine The mixture, after heating at reflux for 16 hours, was still basic. The alcohol was removed under vacuum and the solution diluted with water and filtered. After acidification with glacial acetic acid, a solid was separated by filtration, washed with water, and then recrystallized from ethanol. The yield was 12 g. of p-bromophenyl-3-amino-5-pyrazolone, M.P. 152–161° C. (not completely purified).

The 12 g. (.05 mole) of the amino pyrazolone were dissolved in 100 ml. dry pyridine. The mixture was stirred and cooled to 20° C. and 10.5 g. (0.1 mole) methacrylyl chloride was added dropwise. After the addition was complete, the mixture was warmed to 60° C. and then poured onto cracked ice. A tacky material separated from which water was decanted. With recrystallization from ethanol there was a yield of 2.1 g. of a white solid, M.P. 228–230° C., 1 - (p - bromophenyl) - 3 - methacrylamido-5-pyrazolone. This pyrazolone monomer coupled with the oxidized developing agent, p-aminodiethylaniline, to give a magenta dye.

EXAMPLE I

*Copolymer of 1-(p-Bromophenyl)-3-Methacrylamido-5-Pyrazolone*

A copolymer was prepared by reacting the following materials:

1.465 g. (.005 mole) of the magenta monomer prepared in Procedure B
.71 g. (.01 mole) acrylamide
.72 g. (.01 mole) acrylic acid
8 ml. tertiary butanol
8 ml. dimethyl formamide The mixture was heated to reflux and then there was added 0.1 g. $\alpha,\alpha'$-azo-bis-(isobutyronitrile). After refluxing for ½ hour, the viscous, partially precipitated polymer was poured into ether. It was then filtered, washed with ether and slurried twice in ether. The yield was 3 g. of a lemon yellow solid, a copolymer of the bromo substituted pyrazolone color former, acrylic acid, and acrylamide, with an equivalent weight of 540, i.e., the number of grams of polymer containing one mole of the color-forming nucleus.

EXAMPLE II

*Copolymer of 1-Phenyl-3-Methacrylamido-5-Pyrazolone*

To a 1 liter round-bottomed flask fitted with a reflux condenser was added:

72.9 g. (0.3 mole) 1-phenyl-3-methylacrylamido-5-pyrazolone (the monomer prepared in Procedure A)
600 ml. tertiary butanol
60 g. (0.6 mole) methyl methacrylate
21.6 g. (0.3 mole) acrylic acid
1.2 g. $\alpha,\alpha'$-azo-bis-(isobutyronitrile)

The mixture was heated to reflux for 1 hour giving a viscous solution which was diluted with 1200 ml. tertiary butanol. A solid appeared which was separated by filtration on a Buchner filter, hardened by washing with ether, slurried twice in 500 ml. of boiling ether, filtered, washed with ether and air dried. The product was a white solid weighing 101 g. (65% of theoretical). This was a copolymer of the pyrazolone color-forming monomer methyl methacrylate and acrylic acid having an equivalent weight of 466, i.e., the number of grams of polymer containing one mole of color-former nucleus. A 5% by weight solution of this copolymer in a 1 to 1 (by volume) mixture of $H_2O$ and $C_2H_5OH$, with pH adjusted to 7.6, had a viscosity of 3.56 centistokes at room temperature.

EXAMPLE III

Ten other copolymers were made from the monomer prepared in Example I, with ratios of reacting monomers as shown in the table below wherein the comonomers are indicated by abbreviations as follows:

AA=acrylic acid
AM=acrylamide
MMA=methyl methacrylate
S=styrene
NVP=N-vinyl-2-pyrrolidone
CF=1-phenyl-3-methyacrylamido-5-pyrazolone The preparations were similar to that described in Example II all involving refluxing for 1 hour and all catalyzed by the same compound as used in Example I, α,α'-azo-bis-(isobutyronitrile). Various solvents were used in the polymerizing reaction and these are indicated in the table. Viscosities are given in centistokes at room temperature for solutions of the polymers, varying in concentration from 2.5 to 5.0% by weight as indicated, dissolved in $H_2O$, $C_2H_5OH$, or a 1 to 1 (by volume) mixture of $H_2O$ and $C_2H_5OH$, and adjusted to the pH's indicated.

| | Reactants | Moles | Solvent | Equiv. Wt. Polymer | Visc. |
|---|---|---|---|---|---|
| A | CF MMA AA | 1 1 2 | n-Propanol | 424 | 3.30 5% $H_2O$ pH 10.0 |
| B | CF AA | 1 3 | do | 397 | 1.50 5% $H_2O$ pH 6.3 |
| C | CF NVP AA | 1 1 2 | do | 423 | 2.89 5% $H_2O$ pH 10.8 |
| D | CF AA S | 1 2 1 | do | 419 | 1.46 5% $H_2O$ pH 11.7 |
| E | CF AA | 1 3 | Methyl ethyl ketone | 338 | 2.50 5% ETOH |
| F | CF MMA AA | 1 1 2 | t-Butanol | 422 | 3.49 5% ETOH—$H_2O$ pH 6.3 |
| G | CF MMA | 1 2 | do | 397 | 3.80 5% ETOH—$H_2O$ pH 11.0 |
| H | CF MMA AA | 1 3 1 | do | 587 | 5.02 5% ETOH—$H_2O$ pH 8.6 |
| I | CF MMA | 1 3 | do | 500 | 2.24 5% ETOH—$H_2O$ pH 11.1 |
| J | CF AA AM | 1 2 2 | do | 505 | 4.30 4% ETOH—$H_2O$ pH 6.0 |

EXAMPLE IV

A gelatino-silver halide high speed cine negative emulsion containing 1 mole of silver halide (1.7 mole percent AgI and 98.3 AgBr) and 15 g. gelatin was precipitated, ripened, washed, chemically sensitized with sulfur and gold, optically sensitized to green light, and digested (or second-ripened) in a conventional manner. The emulsion was then cooled and the usual post-digestive adjuvants added. Eight portions were taken from this emulsion, each portion containing 0.075 moles of silver halide.

Solutions of seven of the copolymeric color-formers, whose preparations were described in Examples II and III, were prepared by mixing 6 g. of the copolymer with 75 ml. $H_2O$ and 25 ml. $C_2H_5OH$ and heating this mixture to 190° F. in a beaker covered with a watch glass. After adding 6 ml. of 3 N NaOH with stirring, the solutions were brought to weight of 120 g. with $H_2O$ and filtered through nainsook. Sixty grams of a 10% by weight aqueous solution of gelatin was added to each of the polymeric color-former solutions. To each of seven of the gelatino-silver halide emulsion portions described in the paragraph above, was added 1 of the polymeric color-former solutions just described. To the eighth portion of emulsion, serving as a control in the test of resistance to migration, there was added 90 g. of a 10% by weight aqueous solution of gelatin.

After thorough stirring, the eight emulsions were coated on cellulose triacetate photographic film base so as to give a coating weight of 30 milligrams per square decimeter of silver halide; then over-coated with a thin gelatin abrasion coating and dried in a conventional manner.

Film strips from each of these coatings were exposed in a sensitometer equipped with a neutral density square-root-of-two-step wedge and processed by reversal with all solutions at 75° F. First, they were developed in a solution of the following composition:

| | | |
|---|---|---|
| $H_2O$ | ml | 800.0 |
| p-Methylaminophenol sulfate | g | 1.0 |
| $Na_2SO_3$, anhydrous | g | 60.0 |
| Hydroquinone | g | 10.0 |
| $Na_2CO_3.H_2O$ | g | 50.0 |
| KBr | g | 5.0 |

$H_2O$ to make 1.0 liter.

This was followed by treatment in a short stop bath containing 15 g. chrome alum, 6.5 ml. glacial acetic acid, and $H_2O$ to make 1 liter. After a 3 minute water wash the film strips were given a strong white light reversal exposure and then color developed for 15 minutes in solution of the following composition:

| | Grams |
|---|---|
| p-Aminodiethylaniline hydrochloride | 2.5 |
| $Na_2SO_3$, anhydrous | 10.0 |
| $Na_2CO_3.H_2O$ | 47.0 |
| KBr | 2.0 |

$H_2O$ to make 1 liter.
Adjust pH to 10.9.

Next, the strips were washed for 10 seconds in water, treated for 2 minutes in the short stop described above, washed another 3 minutes in $H_2O$ and bleached for 8 minutes in a solution of the following composition:

| | | |
|---|---|---|
| $H_2O$ | ml | 800.00 |
| $K_2Cr_2O_7$ | g | 10.0 |
| KBr | g | 20.0 |
| $NH_4Br$ | g | 20.0 |
| $KAl(SO_4)_2.12H_2O$ | g | 40.0 |
| Acetic acid, glacial | ml | 60.0 |
| $NH_4OH$, conc. | ml | 21.0 |

$H_2O$ to make 1.0 liter.

This was followed by a 3 minute $H_2O$ wash and 3 minutes fixing in a solution containing 127.2 g. $Na_2S_2O_3$ (anhydrous) and $H_2O$ to make 1 liter. After a final 10 minute wash, the film strips were dried and their densities were read at a wavelength of 546 millimicrons on a precision integrating-sphere densitometer (Frayne, J. G., with Crane, G. R., J. Soc. Motion Picture & Television Eng., volume 35, No. 2, August 1950, page 184), modified as described by A. C. Lapsley and J. P. Weiss (J. Soc. Motion Picture & Television Eng., volume 56, January 1951, page 23).

Sensitometric data are shown in the table below in which the film strips are listed according to the color-forming copolymers contained therein, these copolymers being given designations to correspond to their earlier descriptions in Example II and III.

Under the column heading "Resistance to Migration" are shown the results of a test wherein the film strips were soaked in a solution of the following composition:

| | Grams |
|---|---|
| Sodium sulfite | 10.0 |
| Sodium carbonate | 47.0 |
| Potassium bromide | 2.0 |

Water to make 1.0 liter.

The film strips were soaked in this solution for 15 minutes at 75° F. with occasional stirring. Twenty milliliters of the solution were then filtered into a hundred milliliter beaker and to this solution was added 6 drops of a 2% by weight aqueous solution of p-aminodiethylaniline hydrochloride and 6 drops of a 5% by weight aqueous solution of $(NH_4)_2S_2O_8$. The solution was stirred well and observations were made as to the color of the solution after standing for 2 to 3 minutes. The development of a pinkish color indicated with magenta color-former had migrated out of the film strip. The strips were compared with a control strip which contained no color-former and the four strips in the table below marked "excellent" (Ex. II, Ex. III-G, Ex. III-H, and Ex. III–I showed the same complete lack of pinkish color in the test solution as the control strip itself.

SENSITOMETRIC RESULTS

| Color-Forming Copolymer | Resistance to Migration | Max. Dens. | Min. Dens. | Relative Reversal Speed |
|---|---|---|---|---|
| Ex. II | Excel | 3.94 | 0.32 | 100 |
| Ex. III–A | Fair | 3.96 | 0.29 | 111 |
| Ex. III–C | Fair | 3.90 | 0.26 | 128 |
| Ex. III–F | Good | 3.94 | 0.28 | 115 |
| Ex. III–G | Excel | 3.94 | 0.30 | 163 |
| Ex. III–H | Excel | 3.92 | 0.31 | 137 |
| Ex. III–I | Excel | 3.94 | 0.29 | 147 |

EXAMPLE V

The color-forming monomer prepared in Procedure A, 1-phenyl-3-methacrylamido-5-pyrazolone, was copolymerized with acrylic acid and acrylamide. The reaction mixture contained a 1/1.25/0.70 ratio of pyrazolone color-forming monomer/acrylic acid/acrylamide. Copolymerization was carried out by refluxing for one hour, catalyzing with α,α′-azo-bis-(isobutyronitrile) and using tertiary butanol as the solvent. The resulting copolymer had an equivalent weight of 332.

EXAMPLE VI

The copolymeric color-formers prepared in Examples I and V were added to photographic emulsions in the manner described in Example IV. The resulting photographic emulsions were coated and dried and film strips from these coatings were exposed and processed, all in the manner described in Example IV, except that the color developing solution of that example was replaced by a solution of the following composition:

| | Grams |
|---|---|
| 4-amino-3-methyl-N-ethyl-N-(β-methylsulfonamido-ethyl)-aniline sesquisulfate | 10 |
| Na$_2$SO$_3$, anhydrous | 15 |
| KBr | 2 |
| Na$_2$CO$_3$.H$_2$O | 47 |

Dist. H$_2$O to make 1 liter.
Adjust pH to 12.0.

The processed film strips were analyzed in a Cary Recording Spectrophotometer, Model 14MS to give the results shown in the curves of FIGURE I. Curve A represents the color-former of Example V, while Curve B represents the bromo-substituted color-former of Example I. The slight bathochromic shift caused by the bromo-substitution can be seen in comparing the curves.

EXAMPLE VII

A mixture of 12.15 g. (0.05 mole) of the pyrazolone monomer, 1-phenyl-3-methacrylamido-5-pyrazolone (prepared as in Procedure A), 13.0 g. (0.1 mole) ureido-ethyl vinyl ether, 100 ml. t-butanol, and 0.35 g. α,α′-azo-bis-(isobutyronitrile) was heated to reflux for 1 hour. The polymer gradually separated out of solution. The reaction mixture was poured into a 1 liter beaker and diluted with ether. Next, the polymer was collected by filtration and washed with ether. The yield was 11.0 g. of an almost white solid, a copolymer of the pyrazolone color-former with ureidoethyl vinyl ether.

EXAMPLE VIII

A mixture of the following materials was refluxed for 1 hour:

12.15 g. (0.05 mole) 1-phenyl-3-methacrylamido-5-pyrazolone
9.1 g. (0.05 mole) 2-ethylhexyl acrylate
3.6 g. (0.05 mole) acrylic acid
100 ml. t-butanol
0.8 g. α,α′-azo-bis-(isobutyronitrile) (added after the above ingredients had been dissolved by heating)

After refluxing, the polymer was precipitated by addition of ether, filtered, washed with ether, and then slurried in boiling ether. The yield was 9.0 g. of a copolymer of the pyrazolone color-former, acrylic acid and ethylhexyl acrylate.

EXAMPLE IX

A mixture of the following materials was refluxed for 30 minutes:

12.15 g. (0.05 mole) 1-phenyl-3-methylacrylamido-5-pyrazolone
4.25 g. (0.05 mole) methacrylamide
4.30 g. (0.05 mole) methacrylic acid
100 ml. t-butanol
0.5 g. α,α.-azo-bis-(isobutyronitrile)

The polymer precipitated out of solution and at the end of refluxing was filtered hot, washed with ether, and slurried twice with ether. The yield was 17.0 g. of a white powder, a copolymer of the pyrazolone color-former, methacrylic acid, and methacrylamide.

EXAMPLE X

A mixture of the following materials was refluxed for 60 minutes:

12.15 g. (.05 mole) 1-phenyl-3-methacrylamido-5-pyrazolone
11.2 g. (0.1 mole) butylacrylate
7.2 g. (0.1 mole) acrylic acid
100 ml. t-butanol
.5 g. α,α′-azo-bis-(isobutyronitrile)

At the end of refluxing the solution, which had gradually become more viscous, was poured slowly into ether with stirring. The precipitated polymer was filtered, washed with ether, and then slurried twice in 200 ml. boiling ether. The yield was 20 g. of a white solid, a copolymer of the pyrazolone color-former, butylacrylate, and acrylic acid.

EXAMPLE XI

A mixture of the following materials was refluxed for 1 hour:

12.15 g. (.05 mole) 1-phenyl-3-methacrylamido-5-pyrazolone
7.2 g. (0.1 mole) vinyl ethyl ether
7.1 g. (0.1 mole) acrylic acid
100 ml. t-butanol
.5 g. α,α′-azo-bis-(isobutyronitrile)

The polymer, which gradually separated out of solution during refluxing, was filtered, washed, and slurried as described in the preceding example. The yield was 15 g. of a pale yellow solid, a copolymer of the pyrazolone color-former, vinyl ethylether, and acrylic acid.

EXAMPLE XII

A quaternary salt was prepared by dissolving 5.2 g. (0.05 mole) of 4-vinylpyridine in 25 ml. of water, cooling to 20° C., and adding 6.3 g. of dimethylsulfate. To the quarternary salt solution thus formed was added 50 ml. t-butanol, 7.2 g. (0.1 mole) acrylic acid, and 12.15 g. (0.05 mole) 1-phenyl-3-methacrylamido-5-pyrazolone (as prepared in Example I). This mixture was dissolved by gentle heating and then there was added .4 g. α,α′-azo-bis-(isobutyronitrile) and 50 ml. t-butanol. During 2 hours of refluxing a gummy polymer was formed which was solidified by pouring into acetone. The solid was then pulverized and slurried twice in boiling acetone to yield 24 g. of a pale yellow solid, a copolymer of the pyrazolone color-former, 4-vinyl pyridine methomethsulfate, and acrylic acid.

EXAMPLE XIII

To 0.05 mole of the quarternary salt of 4-vinylpyridine and dimethylsulfate (prepared as described in the preceding example) was added 50 ml. t-butanol, 7.2 g. (0.1 mole) acrylic acid, 5.2 g. (.05 mole) methyl methacrylate, and 12.15 g. (.05 mole) 1-phenyl-3-methacrylamido-5-pyrazolone (as prepared in Procedure A). The mixture was heated until just dissolved and then there was added .4 g. α,α'-azo-bis-(isobutyronitrile). After refluxing for 1 hour, the viscous solution was poured into 200 ml. acetone with stirring. The precipitated polymer was filtered, washed with acetone, and slurried twice in 200 ml. boiling acetone. The yield was 33 g. of a pale yellow solid, a copolymer of the pyrazolone color-former, 4-vinylpyridine methomethsulfate, acrylic acid, and methyl methacrylate. This polymeric color-former was tested as described in Example VI and found to have excellent non-migratory properties.

EXAMPLE XIV

A mixture of the following materials was refluxed for 1 hour:

12.15 g. (.05 mole) 1-phenyl-3-methacrylamido-5-pyrazolone
20.6 g. (.1 mole) styrene sulfonic acid sodium salt
7.2 g. (.1 mole) acrylic acid
3.55 g. (.05 mole) acrylamide
200 ml. t-butanol
.5 g. α,α'-azo-bis-(isobutyronitrile)

The reaction product was filtered while hot and washed with 100 ml. of t-butanol. It was then slurried in 200 ml. of boiling diethyl ether, filtered, and washed with diethyl ether. The yield was 46.45 g. of a white, powdery addition polymer of the monomers listed above. Ten grams of the polymer were dissolved in 100 ml. of 5% NaOH to produce a solution having, at 25° C., a pH of 12.1 and a viscosity of 4.86 centistokes.

EXAMPLE XV

To a 500 ml. round-bottomed flask fitted with a reflux condenser there were added:

6.5 g. (.05 mole) sodium vinyl sulfonate, prepared as described by D. S. Breslow et al., J. Am. Chem. Soc. 76, 5361 (1954)
12.15 g. (.05 mole) 1-phenyl-3-methacrylamido-5-pyrazolone
3.55 g. (.05 mole) acrylamide
100 ml. t-butanol
50 ml. water The mixture was heated to reflux and total solution occurred. Then there was added 0.5 g. of the catalyst, α,α'-azo-bis-(isobutyronitrile), and refluxing was continued for one hour, during which time the solution gradually became more viscous. The solution was poured into a beaker followed by the additions of 500 ml. of acetone and 500 ml. of diethyl ether. The addition reaction product, a copolymer of the above three monomers, separated as a solid which was filtered, washed with acetone, slurried twice in 200 ml. portions of acetone, filtered and dried in air. The yield was 14.0 g. of a lemon-yellow granular solid. Ten grams of this polymer were dissolved in 100 ml. of 5% NaOH on the steam bath to give a solution which, at 25° C. had a viscosity of 4.77 centistokes.

EXAMPLE XVI

To a 200 ml. round bottomed flask fitted with a reflux condenser there were added:

12.15 g. (.05 mole) 1-phenyl-3-methacrylamido-5-pyrazolone
3.55 g. (.05 mole) acrylamide
9.25 g. (.05 mole) redistilled diethylaminoethyl methacrylate
75 ml. t-butanol The mixture was heated to reflux and there was added 0.5 g. of the catalyst, α,α'-azo-bis-(isobutyronitrile). Refluxing was continued for 30 minutes and the tricomponent addition copolymer, which separated as a solid, was filtered from the hot solution, washed with t-butanol and then with diethyl ether. The polymer was then slurried in 300 ml. of boiling ether for 5 minutes, filtered washed with diethyl ether and dried in air. The yield was 14 g. of an almost white solid.

The color-forming compounds of this invention are capable of coupling, during photographic development, to form magenta dye images of excellent spectral characteristics. The dye images, prepared from the preferred copolymers, are superior in their resistance to migration which brings about advantages in color quality and in image sharpness. These dye images have remarkable resistance to fading. A particular advantage of these color-forming polymers is associated with their low equivalent weight which makes possible the manufacture of photographic elements having very thin coatings of emulsion layers, hence very high image definition. These copolymers contribute to the desired thinness of the film not only because of their low equivalent weights, but also because they can act to replace part of the binder since they possess protective colloid properties. A further advantage resides in the ease of synthesis of these compounds. The dual use of the 3-amino group, both for attachment to the polymer and for improved spectral properties, contributes to this ease of synthesis and also contributes to the low equivalent weights which are possible with these novel color-formers. A still further advantage is found in the control that can be achieved over the composition of the copolymers, e.g., the ratio of color-forming to non-color-forming groups, as compared with lack of such control when color-formers are attached to preformed polymers. In contrast with the surfactant type of color-formers, which are hydrophobic at one end and hydrophilic at the other, the color-formers of this invention have the advantage that they do not desorb sensitizing groups from the silver halide grain surfaces. In contrast to photographic elements wherein color-formers are dissolved in oil droplets, the color-formers of this invention have the advantage that they do not add excessively to the thickness of the emulsion.

We claim:
1. An addition copolymer of
   (a) a substituted amidopyrazolone of the formula:

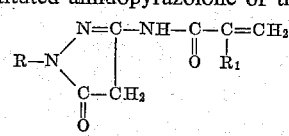

wherein R is a benzene nucleus and $R_1$ is a member selected from the group consisting of hydrogen, and alkyl of 1–4 carbons, and at least one of the monomers:
   (b) a normally non-gaseous, ethylenically unsaturated monomer selected from the group consisting of acrylic and methacrylic acid; styrene sulfonic acid and its salts; sodium vinyl sulfonate; vinyl pyridine and N-vinyl-2-pyrrolidone and their mineral acid and quaternary alkyl ammonium salts, and
   (c) a normally non-gaseous, ethylenically unsaturated monomer selected from the group consisting of styrene, acrylic and methacrylic amides and esters; vinyl ethyl ether and ureidoethyl vinyl ether.

2. A tricomponent copolymer according to claim 1 wherein (a), (b) and (c) are present in the respective amounts of 90 to 10, 5 to 45 and 5 to 45 parts, by weight.

3. An addition copolymer of
   (a) 1-phenyl-3-methacrylamido-5-pyrazolone and at least one of the monomers:
   (b) acrylic acid, and
   (c) acrylamide.

4. An addition copolymer of
   (a) 1-phenyl-3-methacrylamido-5-pyrazolone,
   (b) acrylic acid, and (c) an ester of a monohydric alcohol of 1–8 carbon atoms with acrylic acid.

5. An addition copolymer of
(a) 1-(p-bromophenyl)-3 - methacrylamido-5 - pyrazolone,
(b) acrylic acid, and
(c) acrylamide.

References Cited in the file of this patent

UNITED STATES PATENTS

| | | |
|---|---|---|
| 2,469,696 | Minsk et al. | May 10, 1949 |
| 2,759,910 | Milne et al. | Aug. 21, 1956 |
| 2,794,016 | Glenn et al. | May 28, 1957 |
| 2,817,666 | Beaver et al. | Dec. 24, 1957 |
| 2,829,975 | Popeck et al. | Apr. 8, 1958 |
| 2,850,485 | D'Alelio | Sept. 2, 1958 |
| 2,852,386 | Tong | Sept. 16, 1958 |
| 2,860,986 | Smith et al. | Nov. 18, 1958 |
| 2,927,928 | Schulze | Mar. 8, 1960 |

OTHER REFERENCES

Weissberger et al.: J. Am. Chem. Soc., 66, pages 1851–55 (1944).